US008572563B2

(12) United States Patent
Sundararajan et al.

(10) Patent No.: US 8,572,563 B2
(45) Date of Patent: *Oct. 29, 2013

(54) USER INTERFACES AND SOFTWARE REUSE IN MODEL BASED SOFTWARE SYSTEMS

(75) Inventors: Parthasarathy Sundararajan, Chennai (IN); Srinivasan Ramaswamy, Chennai (IN); Rajagopalan Sethuraman, Chennai (IN); Raghuram Devalla, Chennai (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 1019 days.

This patent is subject to a terminal disclaimer.

(21) Appl. No.: 12/238,463

(22) Filed: Sep. 26, 2008

(65) Prior Publication Data

US 2009/0024657 A1    Jan. 22, 2009

Related U.S. Application Data

(62) Division of application No. 11/065,007, filed on Feb. 24, 2005, now Pat. No. 8,307,339.

(60) Provisional application No. 60/553,091, filed on Mar. 15, 2004, provisional application No. 60/553,089, filed on Mar. 15, 2004, provisional application No. 60/553,088, filed on Mar. 15, 2004.

(51) Int. Cl.
*G06F 9/44* (2006.01)
*G06F 3/00* (2006.01)

(52) U.S. Cl.
USPC ............................ 717/120; 717/104; 715/866

(58) Field of Classification Search
USPC ........... 717/100, 104, 105, 120–123; 715/866
See application file for complete search history.

(56) References Cited

U.S. PATENT DOCUMENTS 4,882,756 A * 11/1989 Watari .......................... 704/241
4,956,791 A * 9/1990 Lee et al. ...................... 706/48

(Continued)

FOREIGN PATENT DOCUMENTS

CA   2254494   *  5/2000
WO   0031626 A    6/2000

(Continued)

OTHER PUBLICATIONS

Schmidt, Douglas C., "Using Design Patterns to Develop Reusable Object-Oriented Communication Software," Oct. 1995, ACM, p. 65-74.*

(Continued)

*Primary Examiner* — Qing Chen
(74) *Attorney, Agent, or Firm* — Prakash Nama; Global IP Services, PLLC

(57) ABSTRACT

User interfaces and software reuse in model based software systems is disclosed. In one embodiment, user interface data is captured from business documents. Further, user interface elements are mapped to the business documents. A data model is formed for the business documents. A set of business rules for each business component in the data model is provided. A sequence of business rules associated with each action in the data model is scanned. In addition, a first pattern signature associated with an action that uniquely identifies each of the sequence of business rules is formed. It is determined if the first pattern signature is present in other actions in the data model. If so, the first pattern signature is included in a set of pattern signatures of the data model, else step of determining for a second pattern signature that is a subset of the first pattern signature is repeated.

14 Claims, 3 Drawing Sheets

(56) References Cited

U.S. PATENT DOCUMENTS

| | | | |
|---|---|---|---|
| 5,189,709 A * | 2/1993 | Wang et al. | 382/215 |
| 5,590,270 A * | 12/1996 | Tsukuda et al. | 717/121 |
| 5,632,022 A * | 5/1997 | Warren et al. | 715/776 |
| 5,724,589 A * | 3/1998 | Wold | 719/318 |
| 6,023,271 A * | 2/2000 | Quaeler-Bock et al. | 715/866 |
| 6,122,757 A * | 9/2000 | Kelley | 714/39 |
| 6,243,851 B1 * | 6/2001 | Hwang et al. | 716/121 |
| 6,292,938 B1 * | 9/2001 | Sarkar et al. | 717/138 |
| 6,346,945 B1 * | 2/2002 | Mansurov et al. | 345/473 |
| 6,381,743 B1 * | 4/2002 | Mutschler, III | 717/104 |
| 6,427,230 B1 * | 7/2002 | Goiffon et al. | 717/108 |
| 6,601,234 B1 * | 7/2003 | Bowman-Amuah | 717/108 |
| 6,678,882 B1 * | 1/2004 | Hurley et al. | 717/121 |
| 6,694,505 B1 * | 2/2004 | Tan | 717/100 |
| 6,748,588 B1 * | 6/2004 | Fraser et al. | 717/146 |
| 6,851,105 B1 * | 2/2005 | Coad et al. | 717/106 |
| 7,096,200 B2 * | 8/2006 | Wang et al. | 705/50 |
| 7,149,734 B2 * | 12/2006 | Carlson et al. | 1/1 |
| 7,171,646 B2 * | 1/2007 | Charisius et al. | 717/100 |
| 7,197,740 B2 * | 3/2007 | Beringer et al. | 717/108 |
| 7,322,024 B2 * | 1/2008 | Carlson et al. | 717/120 |
| 7,562,347 B2 * | 7/2009 | Baumgart et al. | 717/120 |
| 7,631,299 B2 * | 12/2009 | Kannenberg | 717/121 |
| 7,685,563 B2 * | 3/2010 | Kumar et al. | 717/107 |
| 2002/0032900 A1 * | 3/2002 | Charisius et al. | 717/2 |
| 2003/0046282 A1 * | 3/2003 | Carlson et al. | 707/6 |
| 2003/0158760 A1 * | 8/2003 | Kannenberg | 705/4 |
| 2003/0182470 A1 * | 9/2003 | Carlson et al. | 709/328 |
| 2003/0200175 A1 * | 10/2003 | Wang et al. | 705/50 |
| 2003/0233631 A1 * | 12/2003 | Curry et al. | 717/100 |
| 2004/0148586 A1 * | 7/2004 | Gilboa | 717/108 |
| 2004/0172612 A1 * | 9/2004 | Kasravi et al. | 717/101 |
| 2004/0181775 A1 * | 9/2004 | Anonsen et al. | 717/104 |
| 2005/0055667 A1 * | 3/2005 | Beringer et al. | 717/108 |
| 2005/0120332 A1 * | 6/2005 | Martin et al. | 717/105 |
| 2005/0193383 A1 * | 9/2005 | Gryko et al. | 717/163 |
| 2006/0101442 A1 * | 5/2006 | Baumgart et al. | 717/162 |

FOREIGN PATENT DOCUMENTS

| | | |
|---|---|---|
| WO | 0125860 A | 4/2001 |
| WO | 03005243 A | 1/2003 |

OTHER PUBLICATIONS

Schmidt et al., "Software Patterns," Oct. 1996, ACM, p. 36-39.*

Ram et al., "A Pattern Oriented Technique for Software Design," Jul. 1997, ACM, p. 70-73.*

Cinnéide et al., "Automated Software Evolution Towards Design Patterns," Sep. 2001, ACM, p. 162-165.*

Zaremski Amet Al: "Specification Matching of Software Components" ACM Transactions on Software Engineering and Methodology, Association for Computing Machinery, New York, US, vol. 6, No. 4, Oct. 1, 1997, pp. 333-369, XP000755126 ISSN: 1049-331X abstract.

* cited by examiner

USER INTERFACES AND SOFTWARE REUSE IN MODEL BASED SOFTWARE SYSTEMS

RELATED APPLICATIONS

This is a divisional patent application of U.S. application Ser. No. 11/065,007, filed on Feb. 24, 2005, now U.S. Pat. No. 8,307,339, entitled "Software Reuse in Model Based Software Systems," which was a complete patent application claiming priority to the following three provisional applications:

U.S. Provisional Application Ser. No. 60/553,091, entitled "User Interface Driven Data Modeling Approach" by inventor Sundararajan Parthasarathy et al., filed Mar. 15, 2004, which is herein incorporated in its entirety by reference for all purposes.

U.S. Provisional Application Ser. No. 60/553,089, entitled "An Approach to Identify Software Re-Use in a Model Based Software Solution" by inventor Raghuraman Devalla et al., filed Mar. 15, 2004, which is herein incorporated in its entirety by reference for all purposes.

U.S. Provisional Application Ser. No. 60/553,088, entitled "A Formal Approach to Design Generation of Multi-tier Applications Using Behavior Patterns" by inventor Rajagopalan Sethuraman et al., filed Mar. 15, 2004, which is herein incorporated in its entirety by reference for all purposes. The aforementioned applications are hereby incorporated herein by reference in its entirety.

FIELD OF INVENTION

The present invention relates to model based software systems, and in particular, user interfaces and the reuse of software in such model based systems.

BACKGROUND

Model based software solutions involve approaches and implementations in which every significant part of a software development lifecycle is modeled as data and persisted with capabilities that enable a user to perform various steps in the software development lifecycle. This data modeling requires a high level of specialization, and is usually carried out just before the start of coding. The modeled data is persisted and can be used by downstream processes thereby ensuring that all relevant data that is captured by upstream processes are used in the downstream processes without any significant loss of information.

The traditional approach to the data modeling involves an understanding of the system in its entirety including all the data dependencies between various entities in the system. A schema designer who models data, requires detailed information on various business processes addressed by the system and various constituents of the system. For example, the schema designer requires information in terms of entities that need to be stored in the system and their relationship with other data that are to be stored in the system. The data types and sizes of those entities also need to be stored.

This schema can then be represented diagrammatically and reviewed by functional specialists. As the number of entities increase, their interconnections with other entities also increase thereby increasing the complexity of the schema. A fully represented schematic diagram for a fairly complex system has many interconnections that explain the origin and destination of the relationship lines between entities.

The granularity of data captured in a model based environment depends on an extent that the model is used. For example, if functional requirements are captured at a very granular level, it enables a designer to implement these requirements with the exact business logic as envisioned by a requirements engineer.

During a typical modeling process, business logic that is captured at one point in a system is quite often applicable at some other point in the system. However, because of the granularity of the business logic, the set of business rules that may be needed to be reused may not be a single rule but a set of business rules which may form a subset of the business logic implemented elsewhere. Even though these business rules are not reused by the requirements engineer, the design engineer who analyzes them may benefit if he can identify the reuse of the business rules across the various actions. Unfortunately, the task of identifying this subset of the huge set of business rules that exist in the business process is time consuming and strenuous. This makes reuse identification a near impossibility for the design engineer.

BRIEF DESCRIPTION OF THE DRAWINGS

Embodiments of the present invention are illustrated by way of an example and not limited to the figures of the accompanying drawings, in which like references indicate similar elements and in which.

Figure 1:
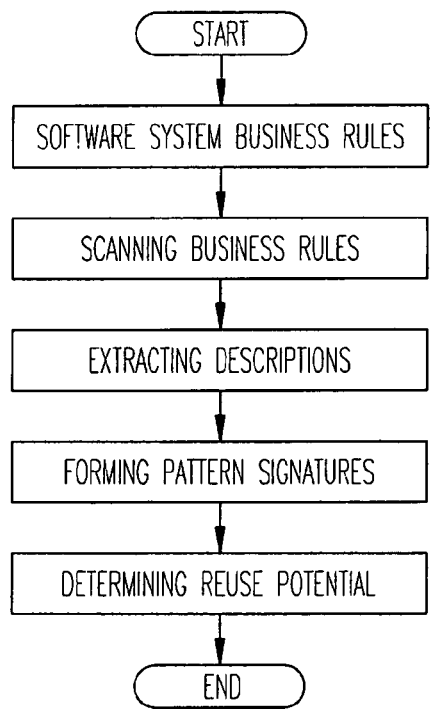
FIG. 1 is a flow chart of an embodiment of the invention.

Other features of the present embodiments will be apparent from the accompanying drawings and from the detailed description that follows.

DETAILED DESCRIPTION

Any software solution is a collection of user interfaces between a user and a repository, where the user's data are stored. These interfaces could be displays, reports, and/or devices such as scanners and readers.

Any such interface can be visualized as a business document with a header section that uniquely identifies the business document. The business document further has various sections, each of which captures related data at various stages in a lifecycle of the business document. Such business documents also refer to other documents for information relating to certain key data items in the document. These could be references to external documents or data copied from the relevant business documents.

An usual approach of designing the user interfaces is to capture data for an underlying business in various stages. Each stage adds value to the data that has been already captured. At each of these stages the data captured has direct relevance to the business document that has been considered for automation.

In an embodiment of the invention, a user interface may normally have several types of elements. There are single instance user interface elements such as edit controls, check boxes and text areas. There are also multiple instance data sets that reflect the various constituents of a business document. These normally reflect the table of data that is present in the business documents, and are incorporated in the user interfaces as grid controls. Also, there are single instance data items that have a predefined list of values of which one can be selected for a particular instance of a business document. These are incorporated in the user interface as Combo Boxes or List controls. Additionally, sets of single instance data items are present as elements, some or all of which could be applicable for the instance of the business document. These can be incorporated as a group of check boxes. There are also non-editable user elements that reflect various business states in which a document can exist at any point in time. These are typically incorporated as display only controls. And there are links to other user interfaces that reflect the references to other business documents that could be referred to for additional information. These may be incorporated as hyperlinks or command buttons that invoke other user interfaces by passing the required context information. Lastly, there are reference data items that reflect data that are copied from the other business documents and are displayed in the user interface. These are incorporated as display only controls in the user interface.

After establishing the methodology of mapping various user elements to probable business documents, the data model is formed for the business document. A business object (BO) represents the business document, and an interface business object (IBO) refers to the business documents from where the information is acquired. Both business objects and interface business objects have data segments that refer to the various sections of the business documents and the related business documents. Each data segment has a unique identifier which uniquely identifies an instance of data in the data segment. A hierarchy of data segments can also be established. This can be accomplished by specifying a parent segment to each data segment. A data item of a data segment could be owned by the data segment itself or be present as a reference to another interface business object, a data segment, or a data item.

In an embodiment, factors that affect such a business object hierarchy are as follows. First, every collection of related user interfaces forms a business object. Second, every related collection of referred user interfaces forms an interface business object. Third, every section in the user interface is a data segment. Fourth, any list of values is a data segment from an interface business object. Fifth, any display only field that displays data from other collections is not stored as data but refers to the corresponding data in the interface business objects. Recording the corresponding interface business object, segment, and data items depicts such relations.

In another embodiment, a database schema can be derived out of this structure of business objects and interface business objects. The physical representation of this embodiment is as follows. Every data segment is represented as database tables, and each of these tables has a primary key formed by the identifier that is a part of the segment and the identifiers of its parent segments. Foreign keys are identified for any data items that refer to interface business objects. Every data segment of an interface business object can be represented as database views or database stored procedures. The data items of the data segment are columns for the corresponding database tables. The data items of the interface business objects are the columns of the corresponding database views or the parameters of the database stored procedures used for integration. This embodiment directly attempts to arrive at a fairly comprehensive database schema that can be further refined for any specific database requirements such as audit trail and concurrency control implications. This embodiment provides a direct relationship of the database schema to the user interface, an intuitive approach to database design that enables a high level of consistency with the user interface, and a quick first cut schema to facilitate overall understanding of the business functionality.

In another embodiment, every function in the system has a set of business rules, and a group of business rules is associated with a particular action performed by an end user. These groups can be completely or partially used as part of another task. Identifying this set of business rules is a challenge for a design engineer. In this embodiment, there are two categories of reuse. First, there are a set of rules in which their identification markers repeat across other actions. Second, there are a set of rules that, after considering the contents of the business rules, repeat across other actions. In either instance however, the repetition indicates the possibility of reuse.

In an embodiment, each distinct action is considered. For each action, a sequential scan is made from the first business rule to the last business rule. As the scan progresses the system forms a pattern signature that uniquely identifies the business rules encountered so far in the sequence. The result is that at the end of this step each action may have a pattern signature associated with it.

Thereafter, each task is again considered. A scan is made through the pattern signature to identify if any part of the signature occurs in the pattern signature of the other actions. If such an occurrence is made then the subset is identified as a pattern and recorded separately along with its occurrences.

This process is continued for all actions. If in this process a pattern is identified that consists of other patterns, then this pattern hierarchy is also maintained. At the end of this process the system has data in terms of the various patterns and their occurrences.

A designer then analyzes this data, and identifies the best possible reuse(s). There are several points that a designer may consider in this process. First, a designer may want to maximize business rule reuse by selecting a pattern with the maximum size, irrespective of its occurrences. The advantage of this approach is that the designer can identify bigger chunks of business logic that can be implemented across the system. Second, a designer may choose to maximize occurrence reuse by selecting patterns that cover the maximum number of actions. This embodiment permits a designer to reduce design effort by spreading the effort over a greater number of tasks. Since the reuse is high with this embodiment, adequate care could be exercised in designing for such patterns. Third, a designer could maximize the total number of business rules that need not be designed for, as a result of pattern reuse. This embodiment ensures that the maximum amount of patterns that can be reused has been extracted, thereby reducing the overall design effort.

In several embodiments, various aspects may be considered before finally arriving at the patterns whose reuses are to be adopted. One such consideration is that as a pattern size is reduced, the reuse of that pattern becomes trivial. That is to say, certain business rules repeat in all actions and are trivial in nature. These should be reused only if it gives a significant benefit for the designers. Reusing patterns that have a negligible business rule count could result in a design overhead that would impact the overall size and effectiveness of the solution.

In an embodiment, in the process of identifying the pattern signature, the description of the business rule is considered. First, white spaces and special characters other than numerical operators are removed. The actions are then analyzed and pattern signatures formed for every action. Then once the pattern signature is formed, the reuse identification process is similar to that of the embodiment of the first approach.

The advantage of this approach is that it relies on the content of the business rule rather than the identifier of the business rule. While in all likelihood this may be a more time consuming process as the operations have to be carried out on the business rule descriptions (rather than just the identifiers), the result may be more effective than that obtained from the other approach (since it is based on the description which by design holds more information). The approach a user adopts depends on the user's needs and the satisfaction level he/she obtains in analyzing the reuse in each of the approaches. The process flow is illustrated in FIG. 1.

These approaches for identifying reuse in a model based environment have several advantages. First, there is a tremendous saving of time as a majority of the operations described can be automated. Second, the embodiments are highly effective as each and every business rule is analyzed and all the various combinations are identified. Third, there is a significant saving of design effort as patterns identified may result in decreased design effort leading to a reduction in the construction efforts also.

In another embodiment of the invention, a specification repository captures extensive information on the interfaces and sequence of actions that are needed at different layers. This is a humungous task when there is a need to develop and deploy software systems that involve hundreds of business components and/or functions. This embodiment then abstracts interfaces and action sequences based on the expected response of the system. This abstraction is based on the study of different user actions and the expected behavior of the system in response, and also the participating user interface elements. The expected response of the system is captured as a set of specification data for each action.

Each user action is associated with the user interface information that influences the behavior, and each user action is modeled as a different variety of action based on the expected behavior of the system. For example, a user interaction may be modeled as a document fetch type if the action requires that the system take a key element from the user interface and come up with all information pertaining to that particular business document.

In an embodiment, to design the middle tier elements for implementing the system response for a user interaction, the designer specifies the type of user action, the user interface controls that are involved in this action, and the expected behavior of the system. The expected response of the system is specified as binary logic (Yes/No) to a variety of questions (e.g., whether refresh is required, related combo to be filled, etc.) This information is stored in the data model. Design generators then use this model information to generate the service interfaces and method interfaces, and invoking back end objects interfaces also, to generate the sequence of these method calls. A facility is provided to override these interfaces to do a dataset reduction of the interface elements of the methods. The design generators take care of passing the appropriate parameters across the different layers.

The salient advantages of this pattern based design are, first, the resulting simplified interface and sequence specifications across layers. This simplified procedure enables the design work to be done by non-specialists who have an understanding of the application. Second, automated plumbing of interfaces across different software artifacts in different layers leads to reduced defects in terms of interface mismatches. Third, there is a standardized design across the entire development team leading to better maintainability. This helps to reduce the dependency of persons to either enhance the product or fix defects. Fourth, there is reduced time for design specifications leading to better productivity. Since the middle layer design is driven by expected response it does not require any special skills and can be effectively done by a business user also.

Figure 2:
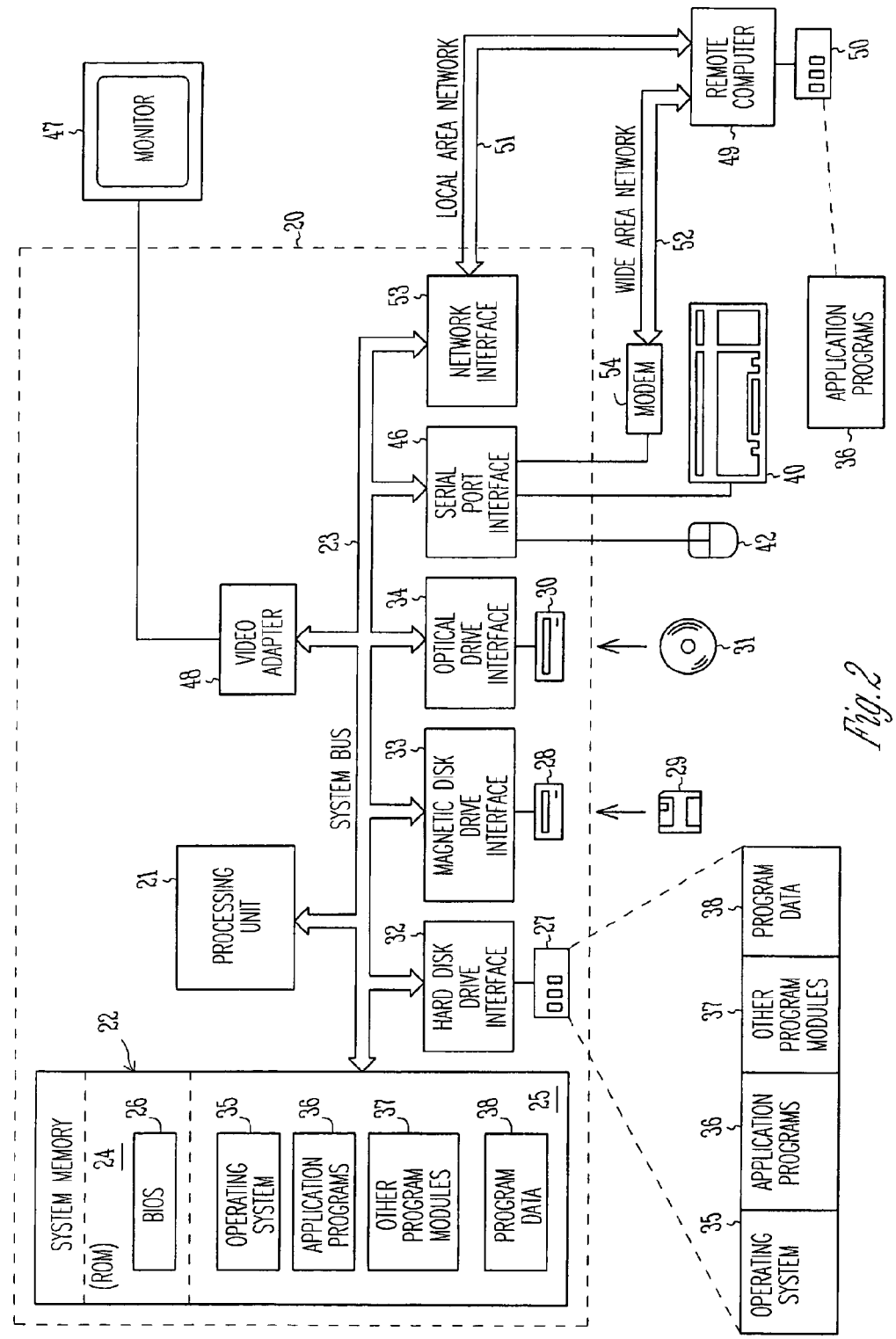
FIG. 2 illustrates a computer system that may be used in connection with the present invention.
Figure 3:
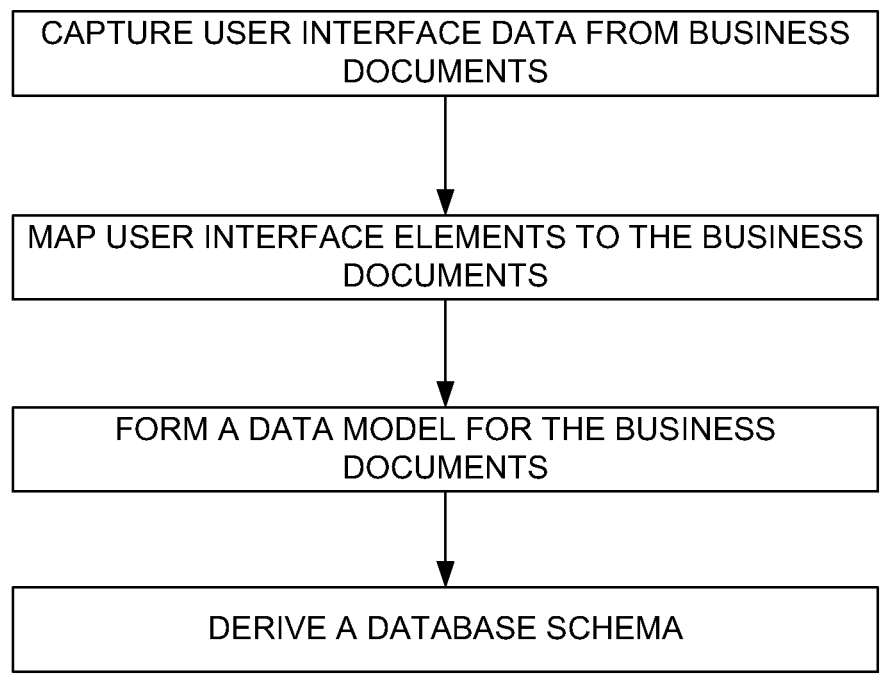
FIG. 3 is a flow chart of another embodiment of the invention.

FIG. 2 is an overview diagram of hardware and an operating environment in conjunction with which embodiments of the invention may be practiced. The description of FIG. 2 is intended to provide a brief, a general description of suitable computer hardware and a suitable computing environment in conjunction with which the invention may be implemented. In some embodiments, the invention is described in the general context of computer-executable instructions, such as program modules, being executed by a computer, such as a personal computer. Generally, the program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments, where tasks are performed by I/O remote processing devices that are linked through a communications network. In a distributed computing environment, the program modules may be located in both local and remote memory storage devices.

In the embodiment shown in FIG. 2, the hardware and operating environment is provided that is applicable to any of the servers and/or remote clients shown in FIG. 1.

As shown in FIG. 2, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of the computer 20 includes a single central-processing unit (CPU), or a plurality of processing units, commonly referred to as a multiprocessor or parallel-processor environment. In various embodiments, the computer 20 is a conventional computer, a distributed computer, or any other type of computer.

The system bus 23 can be any of several types of bus structures including a memory bus or memory controller, a peripheral bus, and a local bus using any of a variety of bus architectures. The system memory 22 can also be referred to as simply the memory, and, in some embodiments, includes read-only memory (ROM) 24 and random-access memory (RAM) 25. A basic input/output system (BIOS) 26, containing the basic routines that help to transfer information between elements within the computer 20, such as during start-up, may be stored in the ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are coupled with a hard disk drive interface 32, a magnetic disk drive interface 33, and an optical drive interface 34, respectively. The drives and their associated computer-readable media provide a non volatile storage of computer-readable instructions, data structures, program modules and other data for the computer 20. It should be appreciated by those skilled in the art that any type of computer-readable media which can store data that is accessible by the computer 20, such as magnetic cassettes, flash memory cards, digital video disks, Bernoulli cartridges, random access memories (RAMs), read only memories (ROMs), redundant arrays of independent disks (e.g., RAID) and the like, can be used in the exemplary hardware and operating environment.

A plurality of program modules can be stored on the hard disk drive 27, magnetic disk drive 29, optical disk drive 31, ROM 24, or RAM 25, including an operating system 35, one or more application programs 36, other program modules 37, and program data 38. A plug-in containing a security transmission engine for the present invention can be resident on any one or number of these computer-readable media.

A user may enter commands and information into the computer 20 through input devices such as a keyboard 40 and a pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface (GUI) for the user. In addition to the monitor 47, the computer 20 typically include other peripheral output devices (not shown), such as speakers and printers.

The computer 20 may operate in a networked environment using logical connections to one or more remote computers or servers, such as a remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 2 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of the remote computer or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skilled in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skilled in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   capturing user interface data from business documents by a processor;
   mapping user interface elements to said business documents by said processor;
   forming a data model for said business documents by said processor, wherein said business documents are represented by business objects, wherein said business documents from which said user interface data is acquired are represented by interface business objects, and wherein said business objects comprise data segments and said interface business objects comprise said user interface elements;
   providing a set of business rules for each business component including one or more business objects of said data model by said processor, wherein said set of business rules provides a business logic used in each business component, and wherein said set of business rules includes a sequence of business rules associated with each action performed by an end user;
   scanning said sequence of business rules associated with each action in said data model by said processor;
   forming a first pattern signature associated with an action that uniquely identifies each of said sequence of business rules based on said scanning by said processor;
   determining if said first pattern signature is present in other actions in said data model by said processor;
      if present, including said first pattern signature in a set of pattern signatures of said data model by said processor; and
      if not present, repeating the step of determining for a second pattern signature that is a subset of said first pattern signature by said processor;
   repeating said steps of forming and determining for a pattern signature for each action in said data model by said processor;
   analyzing said set of pattern signatures by said processor;
   identifying similarities in said set of pattern signatures by said processor; and
   identifying said set of pattern signatures that can be reused in one or more data models based on said similarities in said set of pattern signatures by said processor.

2. The method of claim 1, wherein said data segments comprise a hierarchy.

3. The method of claim 2, wherein said data segments have a data identifier that identifies an instance of data in said data segments.

4. The method of claim 3, further comprising:
forming a hierarchy of said data segments.

5. The method of claim 1, wherein said business documents comprise various sections that capture data at various stages in a lifecycle of said business documents.

6. The method of claim 1, further comprising:
using said business objects and said interface business objects to derive a database schema, wherein said database schema comprises a user interface.

7. The method of claim 1, wherein said user interface elements are selected from the group consisting of edit controls, check boxes, text areas, grid controls, combo boxes, list controls, display only controls, hyperlinks, and command buttons.

8. The method of claim 1, wherein each data segment is represented as database tables in a database schema, and wherein each of said database tables includes a primary key formed by a data identifier that is a part of the respective data segment and identifiers of corresponding parent segments.

9. A non-transitory computer readable medium storing instructions thereon for executing a method comprising:
capturing user interface data from business documents by a processor;
mapping user interface elements to said business documents by said processor;
forming a data model for said business documents by said processor, wherein said business documents are represented by business objects, wherein said business documents from which said user interface data is acquired are represented by interface business objects, and wherein said business objects comprise data segments and said interface business objects comprise said user interface elements;
providing a set of business rules for each business component including one or more business objects of said data model by said processor, wherein said set of business rules provides a business logic used in each business component, and wherein said set of business rules includes a sequence of business rules associated with each action performed by an end user;
scanning said sequence of business rules associated with each action in said data model by said processor;
forming a first pattern signature associated with an action that uniquely identifies each of said sequence of business rules based on said scanning by said processor;
determining if said first pattern signature is present in other actions in said data model by said processor;
if present, including said first pattern signature in a set of pattern signatures of said data model by said processor; and
if not present, repeating the step of determining for a second pattern signature that is a subset of said first pattern signature by said processor;
repeating said steps of forming and determining for a pattern signature for each action in said data model by said processor;
analyzing said set of pattern signatures by said processor;
identifying similarities in said set of pattern signatures by said processor; and
identifying said set of pattern signatures that can be reused in one or more data models based on said similarities in said set of pattern signatures by said processor.

10. The non-transitory computer readable medium of claim 9, wherein said data segments comprise a hierarchy.

11. The non-transitory computer readable medium of claim 10, wherein said data segments have a data identifier that identifies an instance of data in said data segments.

12. The non-transitory computer readable medium of claim 11, wherein said method further comprises:
forming a hierarchy of said data segments.

13. The non-transitory computer readable medium of claim 9, wherein said business documents comprise various sections that capture data at various stages in a lifecycle of said business documents.

14. The non-transitory computer readable medium of claim 9, wherein said method further comprises:
using said business objects and said interface business objects to derive a database schema, wherein said database schema comprises a user interface.

* * * * *